US012271960B2

(12) United States Patent
Madonna et al.

(10) Patent No.: US 12,271,960 B2
(45) Date of Patent: Apr. 8, 2025

(54) ENERGY MANAGEMENT SYSTEM AND METHODS

(71) Applicant: Savant Systems, Inc., Hyannis, MA (US)

(72) Inventors: Robert P. Madonna, Osterville, MA (US); Anna E. Demeo, Southwest Harbor, ME (US); William H. Dillon, Philomath, OR (US); Daniel H. Chapman, Brooklyn, NY (US); Kevin C. Kicklighter, Cottonwood, UT (US)

(73) Assignee: Savant Systems, Inc., Hyannis, MA (US)

( * ) Notice: Subject to any disclaimer, the term of this patent is extended or adjusted under 35 U.S.C. 154(b) by 171 days.

(21) Appl. No.: 17/018,861

(22) Filed: Sep. 11, 2020

(65) Prior Publication Data
US 2021/0073927 A1 Mar. 11, 2021

Related U.S. Application Data

(60) Provisional application No. 62/898,815, filed on Sep. 11, 2019.

(51) Int. Cl.
G06Q 50/06 (2024.01)
G06Q 30/0283 (2023.01)
H02J 3/00 (2006.01)

(52) U.S. Cl.
CPC ......... *G06Q 50/06* (2013.01); *G06Q 30/0283* (2013.01); *H02J 3/008* (2013.01); *H02J 2310/14* (2020.01)

(58) Field of Classification Search
CPC ..... G06Q 50/06; G06Q 30/0283; H02J 3/008; H02J 2310/14
USPC ................. 705/412; 700/286, 295
See application file for complete search history.

(56) References Cited

U.S. PATENT DOCUMENTS 4,001,646 A   1/1977 Howell
5,185,705 A   2/1993 Farrington
(Continued)

FOREIGN PATENT DOCUMENTS

CA      2353667 A1    2/2002
CN   102084569 A  *  6/2011 ............. G01D 4/002
(Continued)

OTHER PUBLICATIONS

Zu et al., A Generic User Interface for Energy Management in Smart Homes:, energyinformatics.springeropen.com; Energy Informatics vol. 1, Article No. 55 (2018); 63 pages (Year: 2018).*

(Continued)

*Primary Examiner* — Daniel Vetter
*Assistant Examiner* — Freda A Nelson
(74) *Attorney, Agent, or Firm* — Cesari and McKenna, LLP

(57) ABSTRACT

An energy management system interoperates with an automation system to provide integrated control over essentially all power-consuming, power-generating, and power storage devices in a home or other environment. The energy management system provides configurable energy management scenes in which one or more values, each representing a desired operating condition, are associated with some or all of the loads of a home, business or other environment. Different energy management scenes may be configured for different environmental conditions including season, day of week, time of day, grid status, battery condition, and generator condition among others.

20 Claims, 7 Drawing Sheets

(56) References Cited

U.S. PATENT DOCUMENTS

| | | |
|---|---|---|
| 6,756,998 B1 | 6/2004 | Bilger |
| 6,834,208 B2 | 12/2004 | Gonzales et al. |
| 6,844,807 B2 | 1/2005 | Inoue |
| 6,970,751 B2 | 11/2005 | Gonzales et al. |
| 7,043,380 B2 | 5/2006 | Rodenberg, III |
| 7,099,723 B2 | 8/2006 | Gonzales et al. |
| 7,415,310 B2 | 8/2008 | Bovee et al. |
| 7,843,333 B2 | 11/2010 | Anglehag |
| 7,864,043 B2 | 1/2011 | Camp, Jr. |
| 8,316,309 B2 | 11/2012 | Bartek |
| 8,380,359 B2 | 2/2013 | Duchene et al. |
| 8,473,325 B2 | 6/2013 | Barnhill, Jr. |
| 8,490,006 B1 | 7/2013 | Reeser |
| 8,640,038 B1 | 1/2014 | Reeser et al. |
| 8,914,724 B2 | 12/2014 | Cipollo |
| 9,088,663 B2 | 7/2015 | Arling |
| 9,300,141 B2 | 3/2016 | Marhoefer |
| 9,306,763 B2 | 4/2016 | Tatzel |
| 9,360,874 B2 | 6/2016 | Imes |
| 9,397,852 B2 | 7/2016 | Sellers |
| 9,876,652 B2 | 1/2018 | Tatzel et al. |
| 9,960,637 B2 * | 5/2018 | Sanders ................ H02J 15/00 |
| 2001/0011284 A1 | 8/2001 | Humpleman |
| 2003/0040813 A1 | 2/2003 | Gonzales |
| 2003/0074088 A1 | 4/2003 | Gonzales |
| 2003/0229900 A1 | 12/2003 | Reisman |
| 2004/0075343 A1 | 4/2004 | Wareham et al. |
| 2004/0163073 A1 | 8/2004 | Krzyzanowski et al. |
| 2005/0030196 A1 | 2/2005 | Harris |
| 2005/0080782 A1 | 4/2005 | Ratnaparkhi |
| 2005/0085930 A1 | 4/2005 | Gonzales |
| 2005/0094610 A1 | 5/2005 | de Clerq |
| 2005/0097618 A1 | 5/2005 | Arling |
| 2005/0102544 A1 | 5/2005 | Brewer |
| 2005/0159823 A1 | 7/2005 | Hayes et al. |
| 2005/0216131 A1 | 9/2005 | Sodemann et al. |
| 2006/0020353 A1 | 1/2006 | Gonzales |
| 2007/0112939 A1 | 5/2007 | Wilson |
| 2007/0192486 A1 | 8/2007 | Wilson |
| 2007/0222295 A1 | 9/2007 | Wareham et al. |
| 2008/0064395 A1 | 3/2008 | Sibileau |
| 2008/0127063 A1 | 5/2008 | Silva |
| 2008/0143305 A1 | 6/2008 | Drugge et al. |
| 2008/0201753 A1 | 8/2008 | Arling |
| 2008/0201754 A1 | 8/2008 | Arling |
| 2009/0077167 A1 | 3/2009 | Baum |
| 2010/0138007 A1 | 6/2010 | Clark et al. |
| 2010/0152910 A1 * | 6/2010 | Taft ........................ H02H 3/042 |
| | | 700/286 |
| 2010/0161146 A1 | 6/2010 | Boss et al. |
| 2010/0312366 A1 | 12/2010 | Madonna |
| 2010/0314940 A1 | 12/2010 | Palmer et al. |
| 2011/0140832 A1 | 6/2011 | Vinkenvleugel et al. |
| 2011/0157476 A1 | 6/2011 | Arling |
| 2011/0167348 A1 | 7/2011 | Silva |
| 2011/0210712 A1 | 9/2011 | Tagare |
| 2011/0313587 A1 | 12/2011 | Lin |
| 2012/0104847 A1 | 5/2012 | Roscoe et al. |
| 2012/0203390 A1 | 8/2012 | Lee et al. |
| 2012/0239218 A1 | 9/2012 | Forbes, Jr. |
| 2012/0260166 A1 | 10/2012 | Cipollo |
| 2012/0260206 A1 | 10/2012 | Cipollo et al. |
| 2012/0262628 A1 | 10/2012 | Wilson |
| 2012/0265459 A1 | 10/2012 | Sfaelos |
| 2012/0278453 A1 | 11/2012 | Baum |
| 2012/0324271 A1 | 12/2012 | Nigam et al. |
| 2012/0330473 A1 | 12/2012 | Meredith et al. |
| 2013/0060357 A1 | 3/2013 | Li |
| 2013/0198785 A1 | 8/2013 | Arling |
| 2013/0219438 A1 | 8/2013 | Arling |
| 2014/0067144 A1 | 3/2014 | Chen et al. |
| 2014/0088780 A1 | 3/2014 | Chen et al. |
| 2014/0139023 A1 | 5/2014 | Hwang et al. |
| 2014/0181704 A1 | 6/2014 | Madonna |
| 2014/0277800 A1 | 9/2014 | Hughes |
| 2014/0336837 A1 | 11/2014 | Kiuchi et al. |
| 2014/0379161 A1 | 12/2014 | Busser |
| 2015/0012145 A1 | 1/2015 | Kiko |
| 2015/0042286 A1 | 2/2015 | Lu et al. |
| 2015/0214759 A1 | 7/2015 | Wooton et al. |
| 2015/0214768 A1 | 7/2015 | Matsuyama et al. |
| 2015/0256665 A1 | 9/2015 | Pera et al. |
| 2015/0276253 A1 | 10/2015 | Montalvo |
| 2015/0280436 A1 | 10/2015 | Weckx et al. |
| 2015/0332586 A1 | 11/2015 | Hamm |
| 2016/0226235 A1 | 8/2016 | Lathrop et al. |
| 2016/0350778 A1 | 12/2016 | Levine et al. |
| 2016/0358722 A1 | 12/2016 | Lakshmanan et al. |
| 2016/0363949 A1 * | 12/2016 | Zimmanck ................ H02J 3/32 |
| 2017/0140602 A1 | 5/2017 | Curt |
| 2017/0236676 A1 | 8/2017 | Bartonek |
| 2017/0288599 A1 | 10/2017 | Chapman et al. |
| 2017/0344045 A1 * | 11/2017 | Forbes, Jr. ............. G05B 13/02 |
| 2018/0075548 A1 | 3/2018 | Madonna et al. |
| 2018/0082816 A1 | 3/2018 | Herrmann |
| 2018/0299160 A1 | 10/2018 | Inuga et al. |
| 2018/0342870 A1 | 11/2018 | Zeng et al. |
| 2019/0261493 A1 | 8/2019 | Dolan et al. |
| 2019/0354127 A1 * | 11/2019 | Forbes, Jr. ........ H02J 13/00034 |

FOREIGN PATENT DOCUMENTS

| | | |
|---|---|---|
| CN | 102323472 A | 1/2012 |
| CN | 202939450 U | 5/2013 |
| CN | 103326381 A | 9/2013 |
| CN | 204230176 U | 3/2015 |
| CN | 104537505 | 4/2015 |
| CN | 105848389 A | 8/2016 |
| JP | 2002-95152 A | 3/2002 |
| JP | 2002320327 A | 10/2002 |
| JP | 2003092844 A | 3/2003 |
| JP | 2003111311 A | 4/2003 |
| JP | 2005110218 A | 4/2005 |
| JP | 2007510394 A | 4/2007 |
| JP | 2007236023 A | 9/2007 |
| JP | 2008310972 A | 12/2008 |
| JP | 2009-507340 A | 2/2009 |
| JP | 2010531129 A | 9/2010 |
| JP | 2010-537622 A | 12/2010 |
| JP | 2011-120323 A | 6/2011 |
| JP | 201222706 A | 2/2012 |
| JP | 2012511300 A | 5/2012 |
| JP | 2012-514963 A | 6/2012 |
| JP | 2012-235615 A | 11/2012 |
| JP | 2013115885 A | 6/2013 |
| JP | 2014003726 A | 1/2014 |
| JP | 2014036465 A | 2/2014 |
| JP | 2014108003 A | 6/2014 |
| JP | 2014165998 A | 9/2014 |
| JP | 2015-215879 A | 12/2015 |
| JP | 2016100917 A | 5/2016 |
| JP | 2016-134939 A | 7/2016 |
| JP | 2016-158479 A | 9/2016 |
| JP | 2016226141 A | 12/2016 |
| JP | 2017511098 A | 4/2017 |
| JP | 2017216789 A | 12/2017 |
| KR | 1014404920000 | 9/2014 |
| WO | WO-2004023624 A1 | 3/2004 |
| WO | WO-2005065148 A2 | 7/2005 |
| WO | WO-2007027063 A1 | 3/2007 |
| WO | WO-2010065197 A2 | 6/2010 |
| WO | WO-2011073020 A2 | 6/2011 |
| WO | WO-2015094518 A1 | 6/2015 |
| WO | WO-2015134987 A1 | 9/2015 |
| WO | WO-201609492 A1 | 1/2016 |
| WO | WO-2016036419 A1 | 3/2016 |

OTHER PUBLICATIONS

Samia Abid et al., "An Optimized Priority Enabled Energy Management System for Smart Homes", Mar. 2017, Conference: 31st IEEE International Conference on Advanced Information Network-

(56) References Cited

OTHER PUBLICATIONS ing and Applications (AINA), Taipei, Taiwan, 2017, 8 pages. (Year: 2017).*
EP Office Action mailed Jun. 7, 2021, EP Application No. 17 777 715.8-1202, 4 pages.
Demeo, Anna, et al. "Community smart grid utilizing dynamic demand response and tidal power for grid stabilization." *Smart Grid and Renewable Energy* 4.07 (2013): 465-472.
Husen et al. "Lighting Systems Control for Demand Response," IEEE 2011, 6 pages.
Kempton, Willett et al. "Vehicle-to-grid power implementation: From stabilizing the grid to supporting large-scale renewable energy." *Journal of power sources* 144.1 (2005): 280-294.
Park, Sung Min. "Control and Integration Strategies for Bidirectional and Unidirectional Converters in Residential Distributed Power Systems." (2015).
PCT Notification of Transmittal of the International Search Report and the Written Opinion of the International Searching Authority, or the Declaration, International Searching Authority, International Application No. PCT/US2020/050516, mailed Nov. 27, 2020, 14 pages.
India application No. 202118025852, First Examination Report mailed Jun. 5, 2023, 7 pages.
PCT Notification of Transmittal of the International Search Report and the Written Opinion of the International Searching Authority, or the Declaration, International Searching Authority, International Application No. PCT/US2022/032286, mailed Jun. 5, 2022, 13 pages.
PCT Notification of Transmittal of the International Search Report and the Written Opinion of the International Searching Authority, or the Declaration, International Searching Authority, International Application No. PCT/US2022/032699, mailed Jun. 8, 2022, 15 pages.

* cited by examiner

ENERGY MANAGEMENT SYSTEM AND METHODS

CROSS-REFERENCE TO RELATED APPLICATIONS

The present application claims the benefit of U.S. Provisional Patent Application Ser. No. 62/898,815, which was filed on Sep. 11, 2019, by William H. Dillon et al. for ENERGY MANAGEMENT SYSTEM AND METHODS, which is hereby incorporated by reference in its entirety. This application is also related to co-pending application Ser. No. 15/706,145, filed Sep. 15, 2017, entitled SYSTEM AND METHODS FOR CREATING DYNAMIC NANO GRIDS AND FOR AGGREGATING ELECTRIC POWER CONSUMERS TO PARTICIPATE IN ENERGY MARKETS, which application is assigned to a common assignee with the present application and is hereby incorporated by reference in its entirety. U.S. Pat. No. 10,042,336 entitled USER-DEFINED SCENES FOR HOME AUTOMATION is hereby incorporated by reference in its entirety.

BACKGROUND OF THE INVENTION

Field of the Invention

The present invention relates generally to the field of electric power and, more specifically, to a system and method for managing electric power consumption in conjunction with a home automation environment.

Background Information

Power management during electric utility failure is often fixed or haphazard, and typically lacks flexibility in managing available auxiliary power to loads. Often critical loads are determined a priori and are hardwired to a generator without the ability to automatically or manually redistribute power to other loads when the need arises.

Thus, there is value in providing flexible electrical power distribution to loads when a local electrical grid is unavailable.

SUMMARY OF THE INVENTION

In accordance with one aspect of the invention, an energy management system interoperates with an automation system to provide integrated control over essentially all power-consuming, power-generating, and power storage devices in a home or other environment. The energy management system provides configurable energy management scenes in which one or more values, each representing a desired operating condition, are associated with some or all of the loads of a home, business or other environment. A value associated with a given load may be binary (e.g., on/off), absolute (e.g., temperature), or relative (e.g., 50% of maximum speed or brightness) in nature. A user or installer may configure different energy management scenes corresponding to different environmental conditions including season, day of week, time of day, grid status, battery state of charge, and generator condition among others.

In accordance with another aspect of the invention, a load which is considered a critical load (i.e., a load which should remain powered even during grid down or emergency conditions) may be assigned a ranking reflecting the relative importance of that load compared to other loads. Using the rankings as well other criteria such as battery condition, generator condition, ambient temperature, time of day, and the like, the energy management system may dynamically manage loads for best overall effect. For example, a load such as a freezer which contains frozen food would typically be assigned a high ranking. Assuming there is sufficient power from batteries or other alternative sources available, the energy management system is configurable to power the freezer along with other highly ranked loads (e.g., security system), while not powering lower ranked loads such as a washing machine or dishwasher.

In accordance with another aspect of the invention, if there is insufficient power available to supply all of the highest rank loads, the energy management system is configurable to down select to a subset (or even a single one) of those loads. Alternatively, the energy management system is configurable to conserve available power by dynamically managing the highest ranked loads. For example, the energy management system may be configured to intermittently power a freezer, thereby conserving power while maintaining a temperature sufficiently cold to preserve food.

In accordance with another aspect of the invention, once an energy management scene is configured, a value initially associated with a given load may be dynamically changed through user input. For example, an energy management scene which includes a variable-speed ceiling fan as a load may be configured with a value that represents 50% of maximum fan speed. Through a user input device, such as a smartphone running an appropriate application, a user may command the energy management system to increase or decrease the ceiling fan's speed. In similar fashion, a user may, in general, command changes to any load that is included in an energy management scene.

In accordance with another aspect of the invention, an energy management scene may be reverted, such that initial conditions, prior to a utility outage, may be restored thereby undoing the actions. A primary is that each of the loads included in the scene is returned to essentially the same operating state that existed prior to activation of the scene.

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
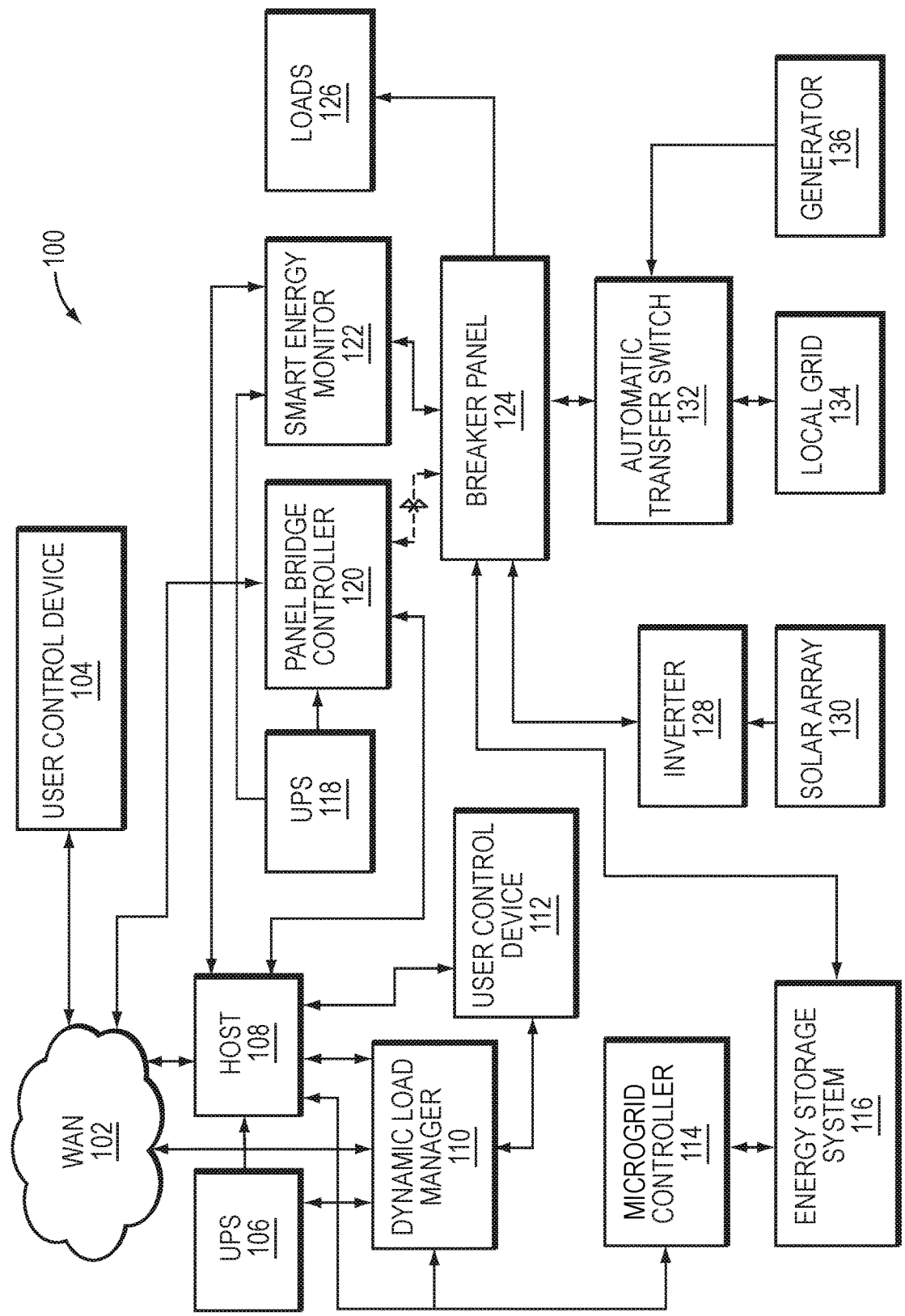
FIG. 1 is a block diagram of an energy management system constructed in accordance with an embodiment of the present invention.

FIG. 1 shows a block diagram of an energy management system 100. A wide area network (WAN) 102 supports bidirectional (wired or wireless) communication with a user control device 104, an automation host 108, a dynamic load manager 110, and a panel bridge controller 120. An uninterruptible power supply (UPS) 106 provides power to automation host 108 and dynamic load manager 110. Similarly, a UPS 118 provides power to panel bridge controller 120 and a smart energy monitor 122. Both automation host 108 and dynamic load manager 110 support bidirectional communication with a user control device 112.

An energy storage system (ESS) field site controller 114 supports bidirectional communication with automation host 108, dynamic load manager 110, as well as ESS 116. As will be understood by persons of skill in the art, the ESS may include control systems to regulate recharge of energy storage as well as delivery of energy. A breaker panel 124 is coupled with ESS 116, one or more inverters 128, an automatic transfer switch 132, and loads 126. Breaker panel 124 supports bidirectional communication with panel bridge controller 120 and a smart energy monitor 122. A solar array 130 is coupled to inverter 128. A local grid 134 and generator 136 are coupled to automatic transfer switch 132. Notably, the intelligent circuit breakers may be implemented in one or more panels such that intelligent components communicating with the bridge controller and smart energy monitor may be located in a first panel, and direct actual power interrupters that stop (interrupt) electrical current may be located in a second panel to meet regulatory compliance.

WAN 102 may be implemented with a private wide area network, the internet, or other network which provides network connectivity having the necessary bandwidth, security, and compatibility to enable communication with user control devices 104 and 112. User control devices 104 and 112 may be implemented with smartphones, tablets, computers or any of a number of other commercially available devices running a user control application (not shown) which is compatible with energy management system 100. As used herein, the user control devices 104 and 112 may refer to general purpose electronic devices, each having a processor that executes software, including a general-purpose operating system, and manipulates data structures maintained in a memory (e.g., a persistent or volatile memory) having locations for storing the software and data structures. In one or more embodiments, devices such as tablets (e.g., computers such as the iPad® tablet running an iOS® operating system) and smartphones (e.g., the iPhone® smartphone running an iOS® operating system or an Android® smartphone running an Android® operating system) are considered user control devices. Further, each user control device 104 and 112 may include a display screen (e.g., a touch sensitive display screen) and may execute an application, e.g., a control application, which presents a user interface (UI) to a user, and relays control commands to the automation host 108, for example, over WAN 102. The control application may utilize a control software development kit that, among other functionality, provides methods for querying a configuration database of the automation host 108 and interacting with a scene engine of the host 108, described further herein.

In an embodiment, the dynamic load manager 110 and automation host 108 are configured to manage power consumption and/or other high-level control functions in the energy management system 100. To that end, the dynamic load manager 110 and automation host 108 may include a processor configured to execute software and manipulate data structures maintained in a memory (e.g., a persistent or volatile memory) having locations for storing the software and the data structures. The data structures may include a configuration database (e.g., structured as a relational database such as a structured query language database), which may utilize logical representations to describe the configuration of the energy management system 100 and its devices, as well as to maintain other types of information. The dynamic load manager 110 and automation host 108 may also include interfaces containing mechanical, electrical and signaling circuitry needed to connect and communicate with UPS 106, Microgrid controller 114, user control devices 104 and 112, panel bridge controller 120 and smart energy monitor 122. Automation host 108 may be implemented based on a host commercially available from Savant Systems, LLC. Dynamic load manager 110 may be implemented in a manner similar to that of a "premises power controller" described in the above-incorporated application Ser. No. 15/706,145. While illustrated for example as separate devices, some or all of the functions performed by dynamic load manager 110 may be performed by automation host 108.

Microgrid controller 114 may be implemented based on a microgrid site controller commercially available from ELM FieldSight, LLC. ESS 116 may represent one or more commercially available, large capacity batteries (not shown) or other commercially available energy storage devices. Among other features and capabilities, the dynamic load manager 110 is configured to manage Microgrid controller 114 to dynamically provide power (as needed) from ESS 116 to components of the energy management system 100.

Panel bridge controller 120 and smart energy monitor 122 may be implemented in a manner similar to that of a "gatekeeper transceiver" described in application Ser. No. 15/706,145. Breaker panel 124 may be implemented, using a combination of conventional circuit breakers and "intelligent circuit breakers", in a manner similar to that described in application Ser. No. 15/706,145. In an embodiment, the panel bridge controller 120 and smart energy monitor 122 are configured to exchange (transmit and receive) messages with automation host 108 or with other wireless devices (such as user control device 104) over WAN 102 to control operation of the circuit breakers in breaker panel 124.

UPS 106 and 118, inverter 128, solar array 130, automatic transfer switch 132, and generator 136 may each be implemented with commercially available equipment from a variety of sources. In an embodiment, the inverter 128 is configured to convert DC to AC, and may include an internal disconnect which functions to isolate the solar array 130 when power is disconnected. Alternatively, a separate disconnect or AC combiner bus (not shown) may be provided between inverter 128 and breaker panel 124. Automatic transfer switch 132 is configured to enable generator 136 and/or local grid 134 to supply power to loads 126 via breaker panel 124. Loads 126 represent power-consuming loads (e.g., devices, appliances, and the like) of a home or other environment. Local grid 134 represents a local power grid operated by a utility.

In general, energy management system 100 operates to manage essentially all power-consuming (e.g., loads 126), power-generating (e.g., solar array 130, local grid 134, generator 136), and power storage (e.g., ESS 116) devices in a home or other environment. To facilitate such management, software executing on the automation host 108 of energy management system 100 may include a scene engine 506 (FIG. 5) that cooperates with a service request handler 502 and configuration database 508 to create and provide configurable energy management scenes which specify a desired operating condition for one or more loads as described further herein. Illustratively, the energy management scenes may be embodied as macros or computing instructions configured to control a collection of services or devices in a predefined manner. In one or more embodiments, the energy management scenes may be maintained in data structures organized as scene objects that are used by the scene engine 506 executing on the energy management system. Each energy management scene may be defined by capture of current operating states of a service or device (e.g., using a capture command) to build a set of current system states organized as a respective scene object that is created (e.g., using a create command) and persistently stored in the configuration database.

Figure 2:
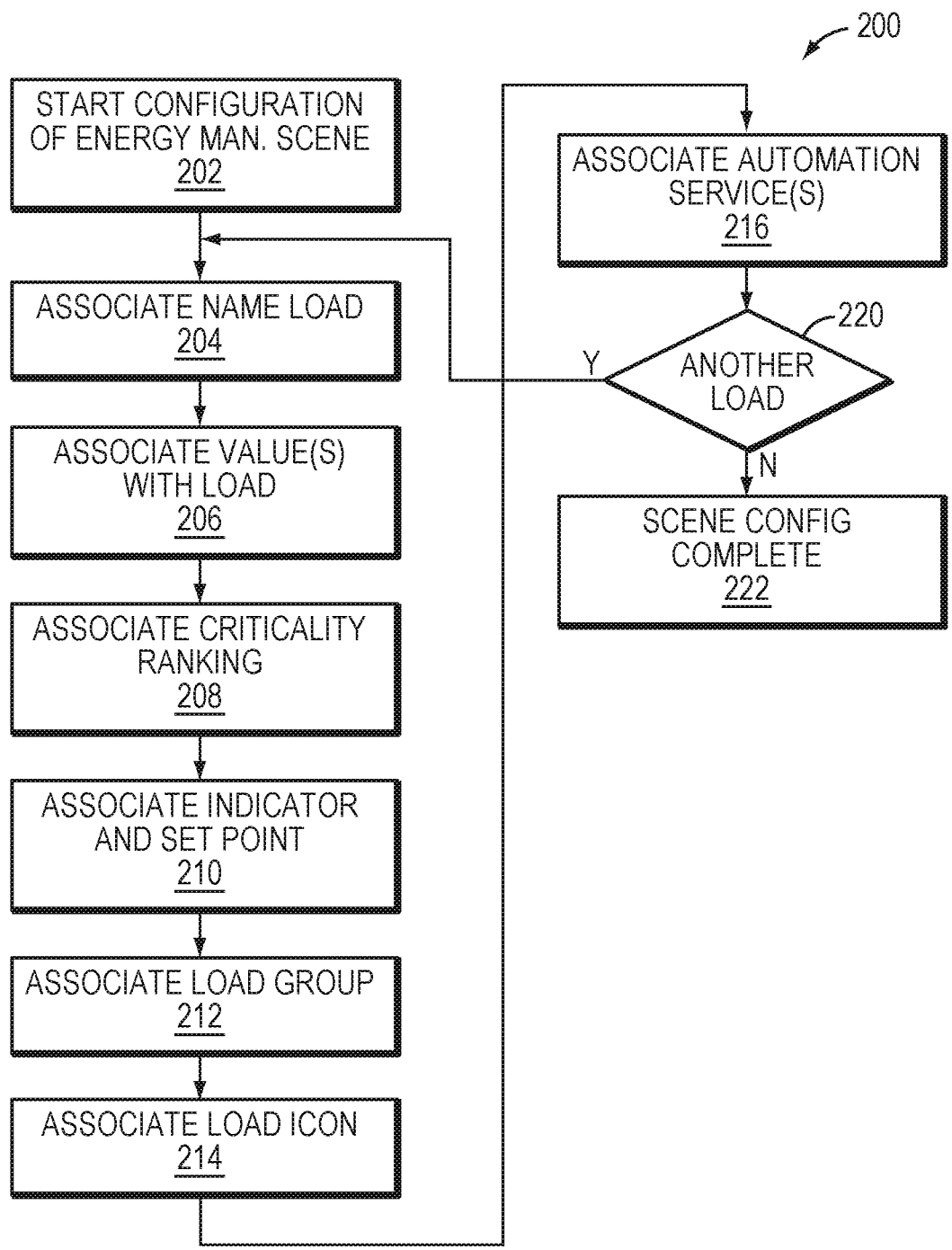
FIG. 2 is a flowchart illustrating configuration of an energy management scene for use with the energy management system of FIG. 1.

FIG. 2 is a flowchart showing a method for configuring an energy management scene 200 for execution by energy management system 100. At step 202, configuration of an energy management scene starts by, e.g., creating a scene object for the energy management scene. Next, at step 204, a name is associated with a load that will be included in the scene object for the energy management scene. In an embodiment, association of attributes (such as names, critical rankings, indicators, set points, load groups, load icons, automation services) with a load may be effected by storing the attributes in scene objects for processing in accordance with the energy management scene. This is followed by step 206 in which at least one value is associated with the load named in step 204. The value represents a desired operating condition of the associated load within the scene object of the energy management scene. Thus, the value may be binary in nature (e.g., on/off), absolute (e.g., temperature), or relative (e.g., 50% of maximum speed or brightness).

Next, at step 208, a criticality ranking is associated with the load named in step 204. In general, the higher the criticality ranking, the higher the priority the load will be given in conditions in which there is insufficient power available to power or fully power all loads included in an energy management scene. This is followed by step 210 in which an indicator and set point may be associated with the load named in step 204. The indicator signifies whether the load is a candidate for intermittent power and, if so, the set point may be used as a reference to determine how frequently to supply power to the load. Examples of loads which are candidates for intermittent power are refrigerators, freezers, water pumps, water heaters, pool pumps, and pool heaters.

Next, at step 212, the load named in step 204 may be associated with a load group (e.g., lighting, HVAC). At step 214, the load named in step 204 may be associated with a load icon. Load groups and icons provide greater convenience and ease of use in terms of user interface displays and overall operation.

At step 216, the load named in step 204 may be associated with one or more automation services controlled by automation host 108 (FIG. 1). Such association may be used to inform automation host 108 whether a given load is in an operating condition necessary to support a particular automation service. For example, if an automation service requires that a particular TV be turned on, then an association at step 216 may inform automation host 108 whether a power outlet connected to the TV is energized.

Next, at step 220, a determination is made whether there is another load to include in the scene object of the energy management scene. If so, the method returns to step 204. If not, the energy management scene configuration is complete 222.

Using method 200, a variety of energy management scenes may be configured to address different conditions. For a typical environment, there are four energy management scenes which together may address most environmental conditions: "Normal", "Money Saver", "Critical Load", and "Island". As the name implies, the "Normal" energy management scene may be active when power is readily available from a local grid, people are present in a home or other environment, and no emergency condition is detected. In general, loads are not dynamically managed by energy management system 100 when the "Normal" scene is active.

Utility costs may be reduced by taking advantage of time-of-use pricing (e.g., peak pricing vs. off-peak pricing) used by most electric power utilities. In the "Money Saver" energy management scene, energy management system 100 may, depending upon status of ESS 116 (e.g., battery condition), use power from ESS 116 to supply loads during peak pricing. Conversely, local grid 134 may be used to power loads (and charge batteries in ESS 116) during off peak pricing.

In the event that local grid 134 (FIG. 1) is down, the "Critical Load" energy management scene may be appropriate. In this scene, using available power from ESS 116, solar array 130, and generator 136, only loads with the highest criticality rankings (i.e., specified loads) are powered. Such loads may typically include a security system, refrigerators and freezers, and minimal lighting for safety. Other loads with lower criticality rankings (i.e., unspecified loads) are disconnected, and not powered, by action of intelligent circuit breakers in breaker panel 124. Different "Critical Load" energy management scenes may be configured for different seasons or other varying conditions.

The "Island" energy management scene is appropriate for occasions when a user voluntarily disconnects from local grid 134, while continuing to power all loads using power exclusively from ESS 116, solar array 130, and generator 136.

Figure 3A:
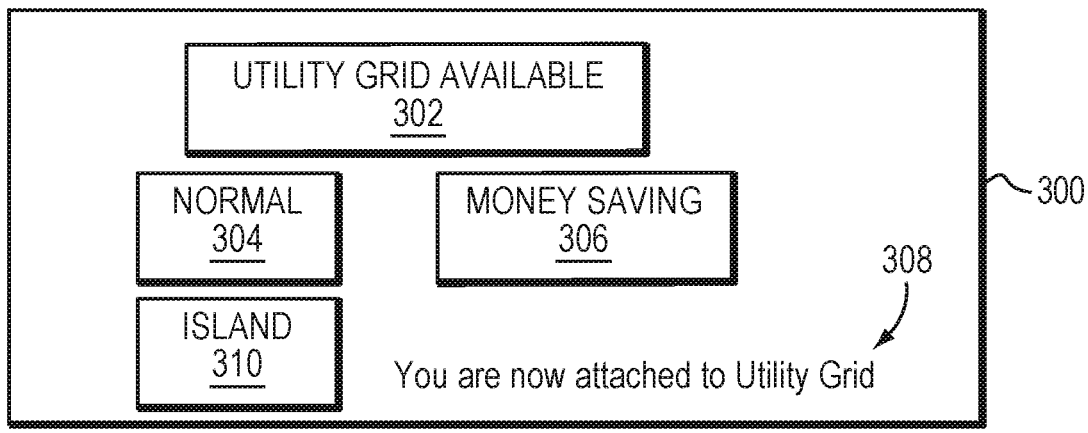
FIGS. 3A-3C are screen representations of a user interface depicting different operating states of the energy management system of FIG. 1.

FIG. 3A shows a screen representation 300 of a user interface for controlling energy management system 100. Screen representation 300 may be displayed, for example, on touch-sensitive displays of user control devices 104, 112 (FIG. 1). As shown in FIG. 3A, a grid availability status 302 provides a visual indication that local grid 134 is available to supply power. In addition, a grid attachment status 308 provides a visual indication that automatic transfer switch 132 is in a position that connects local grid 134 with breaker panel 124, which in turn powers loads 126. A user may activate a previously configured "Normal" energy management scene by pressing button 304. Alternatively, a user may activate a previously configured "Money Saving" energy management scene by pressing button 306. As a further alternative, a user may activate a previously configured "Island" energy management scene by pressing button 310.

Figure 3B:
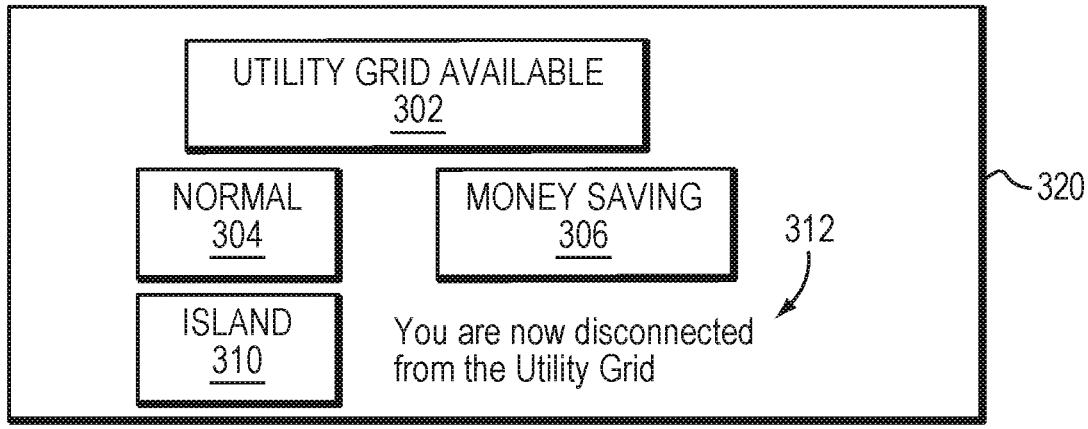

As shown in FIG. 3B, following a press of button 310, screen representation 320 shows that an "Island" energy management scene is active, and a grid attachment status 312 provides a visual indication that breaker panel 124 is now disconnected from local grid 134 (even though local grid 134 is available according to grid availability status 302).

Figure 3C:
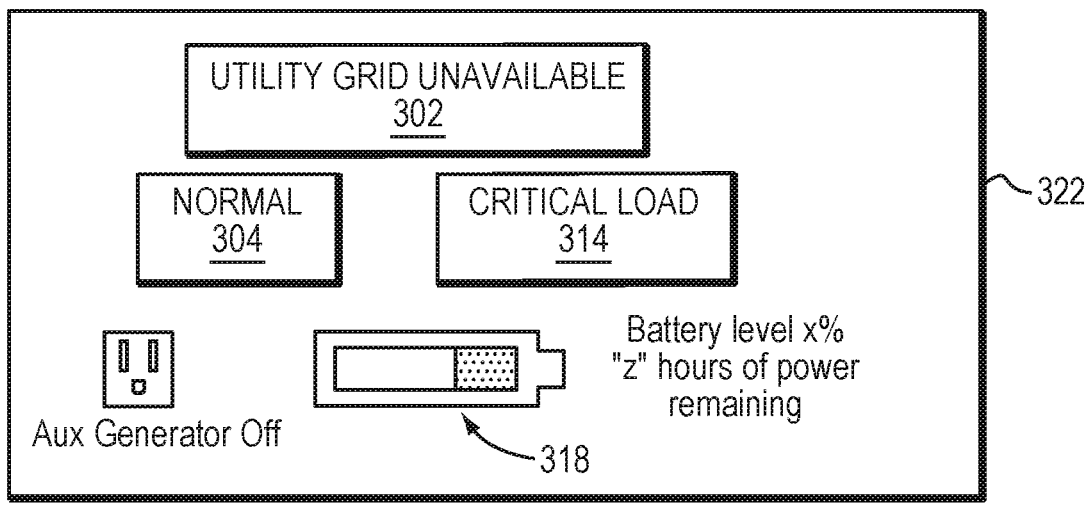

FIG. 3C shows a screen representation 322 in which grid availability status 302 indicates that local grid 134 is unavailable. A user may activate a previously configured "Critical Load" energy management scene by pressing button 314. A generator status 316 indicates that generator 136 (FIG. 1) is off. A battery state of charge (SOC) indicator 318 shows remaining battery charge and an estimate of the number of hours of power remaining at current load level.

Figure 4:
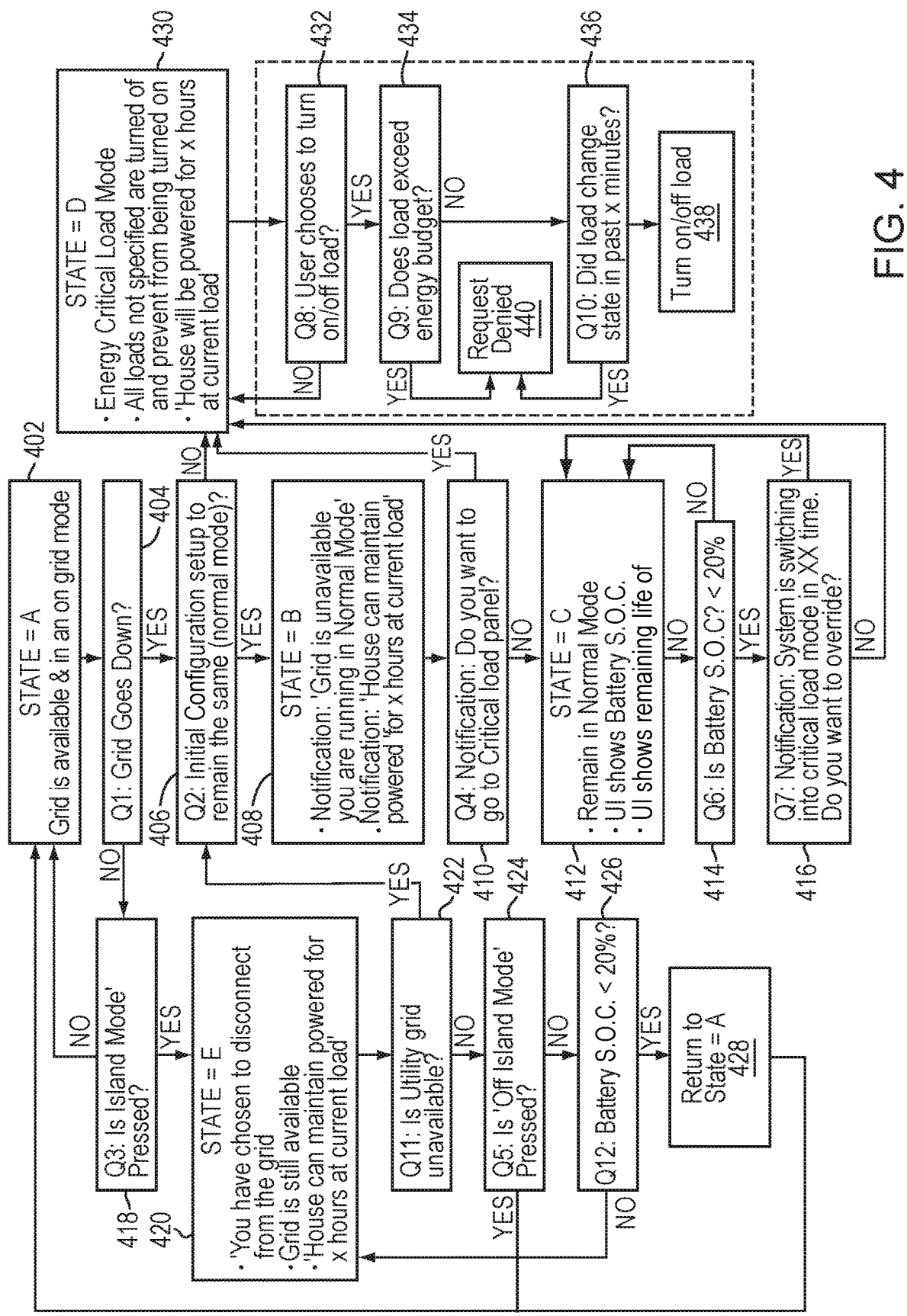
FIG. 4 is a flowchart depicting operation of the energy management system of FIG. 1 in response to a grid failure.

FIG. 4 illustrates a method 400 for energy management system 100 to respond to a grid failure. While a grid failure is shown as a triggering event in FIG. 4, it should be understood that energy management system 100 may, in general, be flexibly configured to respond during run-time to other grid-related events or other events (e.g., a change in operating state) that can be detected by system 100 or other devices in communication with system 100. At step 402, energy management system 100 determines that local grid 134 is available and connected, through automatic transfer switch 132, to breaker panel 124. Next, at step 404, a check is made whether local grid 134 has failed and gone down. If so, method 400 advances to step 406 and a determination is made whether a change in the configuration of energy management system 100 is appropriate. If no change in configuration is to be made, method 400 advances to step 408 in which a screen representation, similar to screen representation 322 of FIG. 3C, is displayed on user control devices 104, 112. If a change in configuration is to be made, method 400 advances to step 430 discussed below.

Next, at step 410, through a screen prompt, a user is asked whether to activate the "Critical Load" energy management scene. If not, method 400 advances to step 412 and energy management system 100 remains in the "Normal" energy management scene. If so, method 400 advances to step 430 discussed below.

At step 414, a determination is made whether the battery SOC is less than 20%. If not, method 400 loops to step 412. If so, method 400 advances to step 416 at which a screen prompt advises a user that, in the absence of an override, energy management system 100 will shortly activate the "Critical Load" energy management scene to conserve remaining battery power. If a user override occurs, method 400 loops to step 412 and continues to power all loads.

If there is no user override at step 416, method 400 advances to step 430 and activates the "Critical Load" energy management scene. Next, at step 432, a determination is made whether a user has requested to turn off or turn on a load. If not, method 400 loops to step 430. If so, method 400 advances to step 434 where a determination is made whether a load requested by a user exceeds an energy budget. If so, the user's request is denied at step 440. If not, a determination is made at step 436 whether the requested load changed state within a predetermined past period of time. If so, the user's request is denied at step 440. If not, the user's request is granted at step 438.

Returning to step 404, if a determination is made that local grid 134 has gone down, method 400 advances to step 418 where a determination is whether a user pressed a button (i.e., button 310, FIG. 3A) to select the "Island" energy management scene. If not, method 400 loops to step 402. If so, method 400 advances to step 420 in which a screen representation, similar to screen representation 320 of FIG. 3B, is displayed on user control devices 104, 112. Next, at step 422, a determination is made whether local grid 134 is still unavailable. If so, method 400 loops to step 406. If not, method 400 advances to step 424 to determine whether a user pressed a button (i.e., button 310, FIG. 3A) to deactivate the "Island" energy management scene. If so, method 400 loops to step 402. If not, method 400 advances to step 426 to determine whether battery SOC is less than 20%. If not, method 400 loops to step 420. If so, method 400 loops to step 402.

Figure 5:
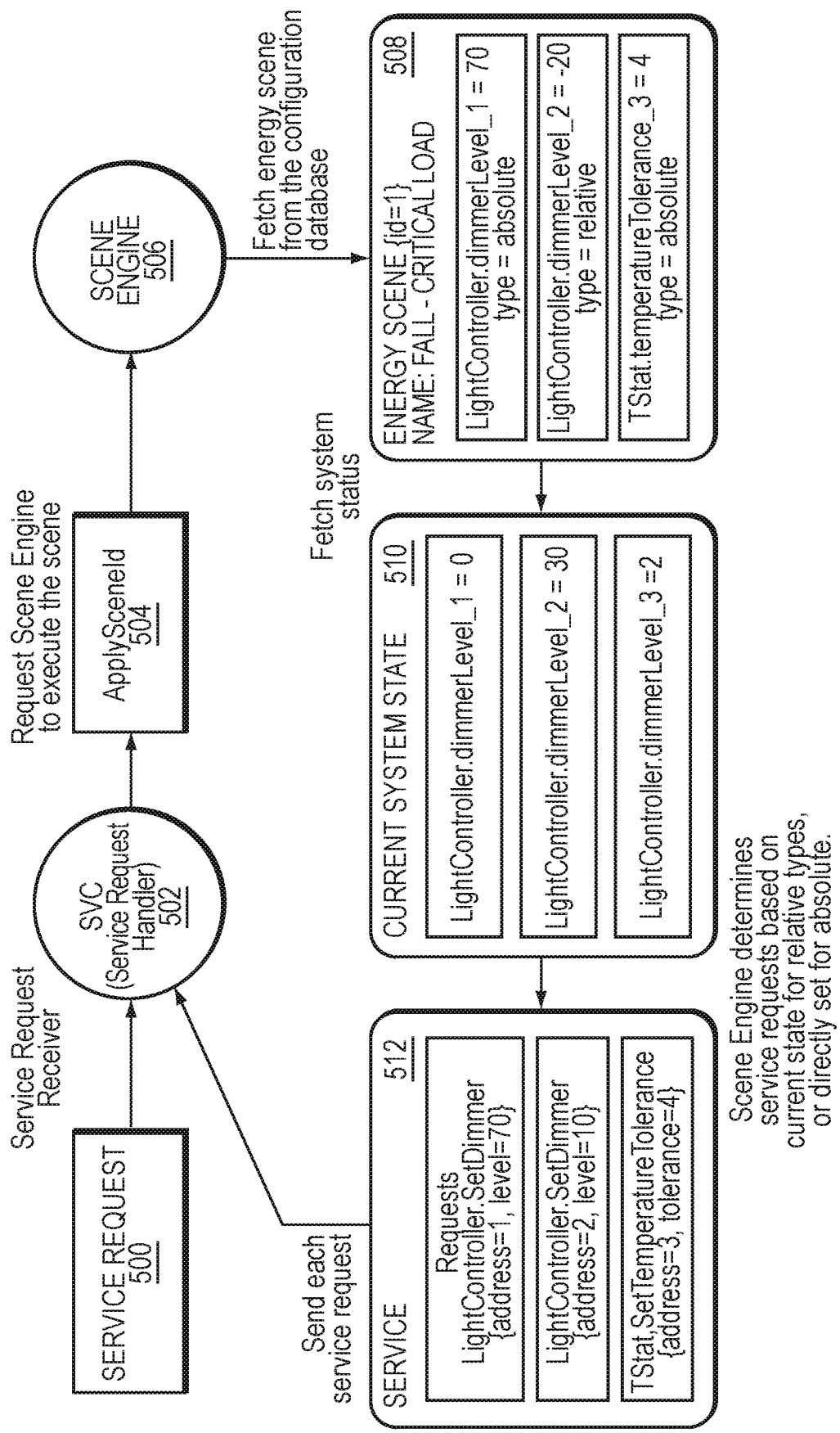
FIG. 5 is a block diagram illustrating how a user input device may be used to command a change in an operating state of a load in an energy management scene.

FIG. 5 is a block diagram illustrating a method for changing an operating state of a load by changing a value associated with the load in an energy management scene. A service request 500, which is related to a load that is part of an energy management scene, is typically generated by user input to user control devices 104, 112 (FIG. 1). Service request 500 may represent any of a wide variety of possible actions including thermostat temperature change or lamp brightness change among others.

Service request 500 is received by a service request handler 502 of the automation host 108 which recognizes the service request is related to a load in an energy management scene. In response, service request handler 502 issues a request 504, addressed to scene engine 506, to execute a specific energy management scene. In turn, scene engine 506 fetches the scene object for the energy management scene to which service request 500 relates from a configuration database 508 in which the scene object was previously stored. Next, scene engine 506 fetches a current system state 510 which includes the current operating state of each load that is part of the scene object for the energy management scene being executed by scene engine 506.

Based on current system state 510 (for loads with associated values that are relative in nature) or a value that accompanied service request 500 (for loads with associated values that are absolute in nature), scene engine 506 generates one or more service requests 512 which, when communicated to and processed by service request handler 502, will effectuate the change in a load's operating condition intended by the user. For example, assume a user, through user control devices 104, 112, entered a new desired temperature (i.e., a new absolute value associated with a smart thermostat) which accompanied service request 500. Service requests 512, generated in response to service request 500, would directly or indirectly command the smart thermostat to the new desired temperature.

Figure 6A:
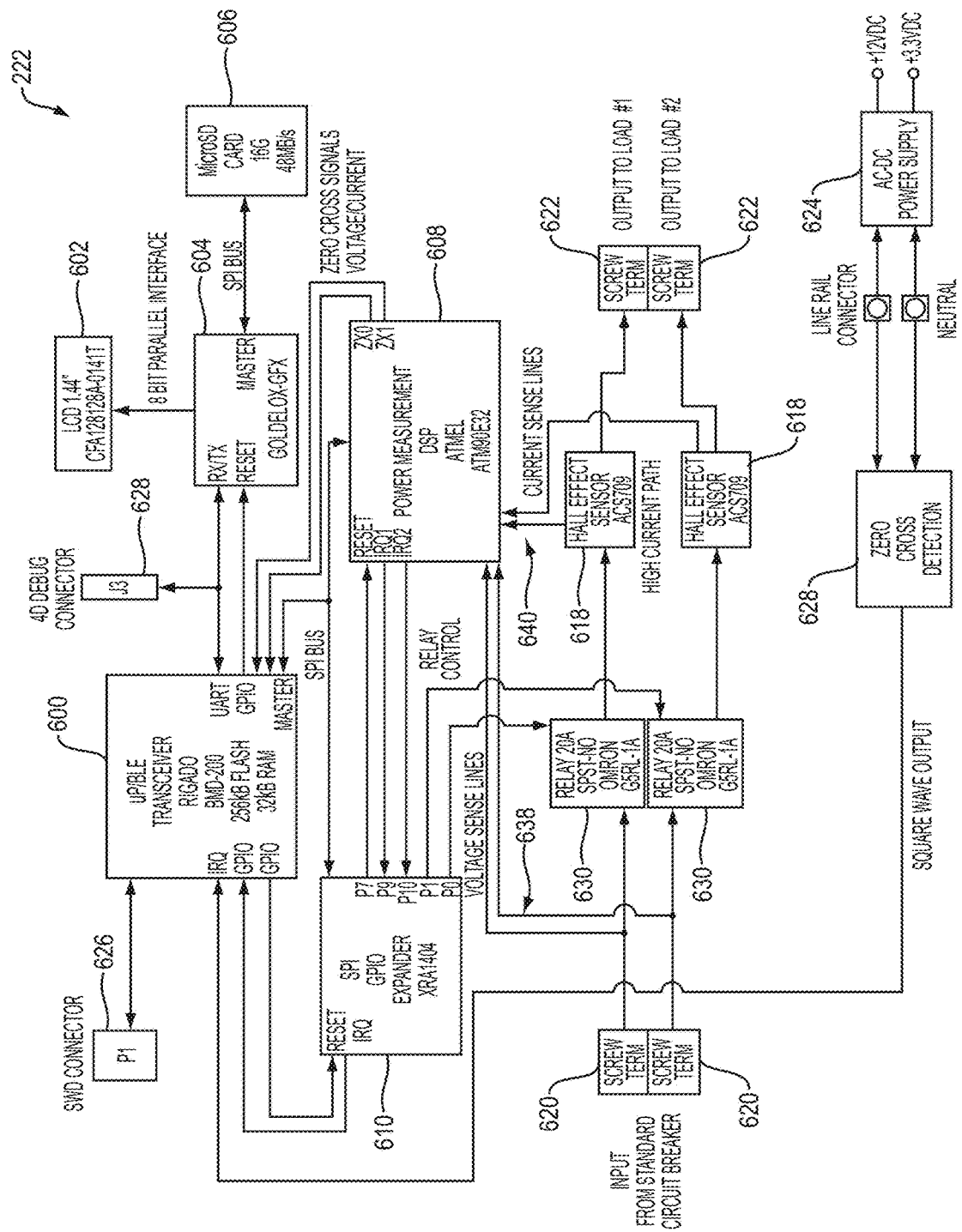
FIG. 6A is a block diagram of an intelligent circuit breaker for two 15A/120 VAC circuits.

FIG. 6A is a block diaphragm of an intelligent circuit breaker described above as included in breaker panel 124 shown in FIG. 1. As shown, intelligent circuit breaker supports two 15A/120 VAC circuits. A processor with onboard Bluetooth transceiver serves as a breaker controller 600. Breaker controller 600 may be implemented with a Rigado BMD-200 module or similar commercially available component. Breaker controller 600 is coupled to a serial wire debug (SWD) connector 626, a 4D debug connector 628, a GPIO expander 610, an embedded graphics controller 604, and a power measurement digital signal processor (DSP) 608. Power measurement DSP 608 is also coupled to voltage sense lines 638 and current sense lines 640.

Breaker controller 600, using its onboard Bluetooth® connectivity, communicates with other breaker controllers to establish a wireless mesh network among all of the breaker controllers. The presence of a mesh network advantageously enables a single breaker controller within a breaker panel or, alternatively, a designated gatekeeper transceiver, to conduct communications with a premises power controller (FIG. 2), and propagate such communications to all other breaker controllers. Alternatively, a wireless mesh network may be established using Zigbee, Z-wave or other suitable technologies.

By knowing when zero crossings of current and voltage are occurring, breaker controller ensures that relays 630 are only switched (i.e., intelligent circuit breaker 222 is opened or closed) contemporaneously with the occurrence of a zero crossing. This advantageously reduces arcing and tends to prolong the service lives of relays 630.

An intelligent circuit breaker suitable for a single 30A/ 220 VAC circuit may be implemented using the components shown in FIG. 6A except for substituting a Rigado BMD-300 module for breaker controller 600.

Figure 6B:
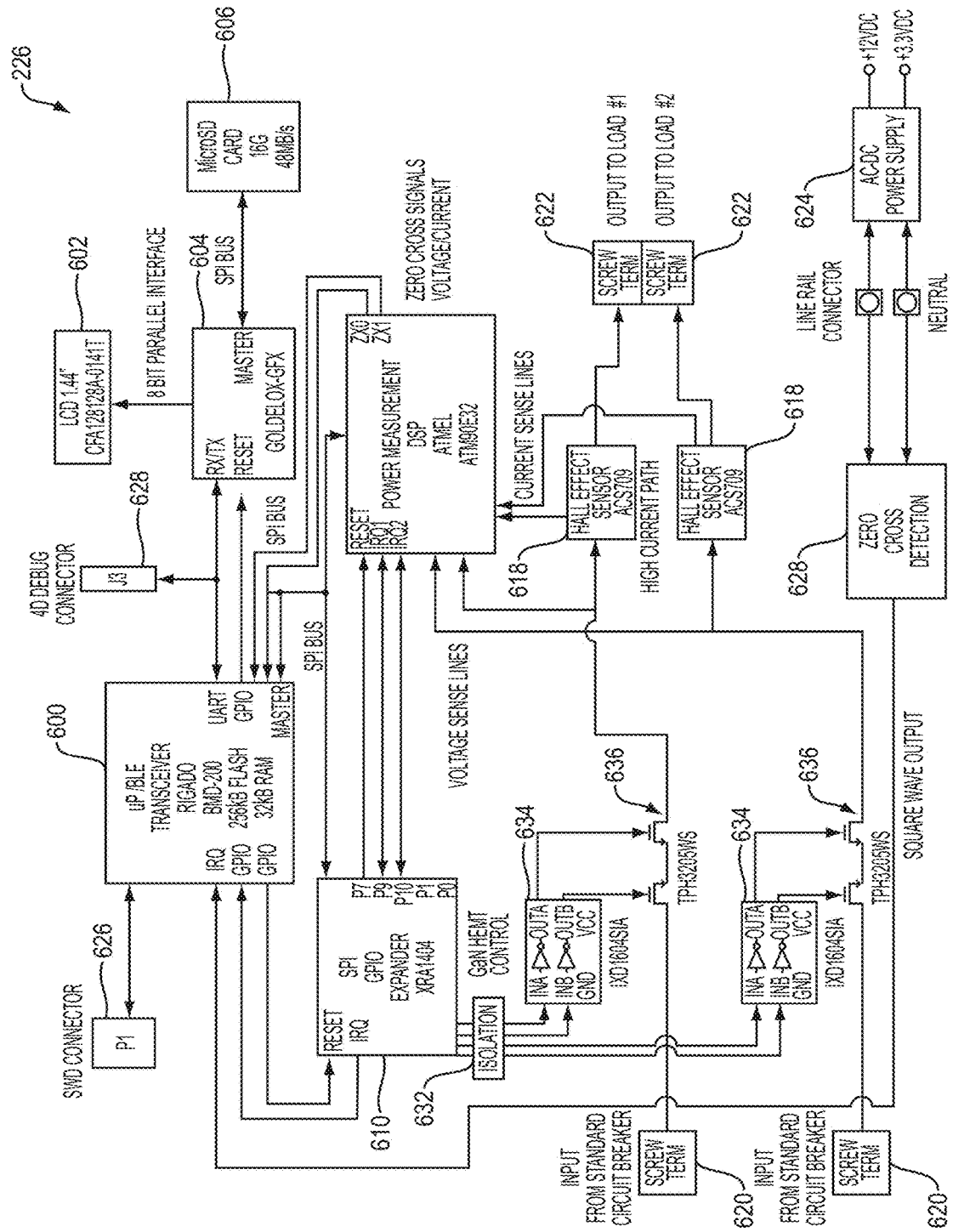
FIG. 6B is a block diagram of an intelligent circuit breaker for two 15A/120 VAC circuits which includes two dimmer circuits.

FIG. 6B is a block diagram of an intelligent circuit breaker with dimmers. Most of the components are the same as those shown in FIG. 6A. However, instead of relays 630, intelligent circuit breaker with dimmers 226 includes an isolation circuit 632 which is coupled between GPIO expander 610 and two pairs of gallium nitride high electron mobility (GaN HEMT) transistors 636 which, with their respective controls 634, function as dimmers. Each pair of transistors 636 is coupled to power measurement DSP 608 as well as one of Hall Effect sensors 618. Conventional dimmers utilize silicon-based field effect transistors (FETs) or TRIACs, both of which have a higher on resistance (Ron) than GaN HEMT components. Thus, conventional dimmers must dissipate more heat for a given amount of current, which is problematic and potentially unsafe in a circuit breaker panel with tightly packed components. In order to effectively dissipate heat, conventional dimmers require large heat sinks that do not fit well or at all in conventional breaker panels. By using GaN HEMT components for the dimmers, significant reduction in heat dissipation is advantageously achieved without the need for bulky heat sinks, thereby enabling more circuits to be safely packed in a given area.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly, this description is to be taken only by way of example and not to otherwise limit the scope of the invention. It is thus the object of the appended claims to cover all such variations and modifications as come within the true spirit and scope of the invention.

The invention claimed is:

1. A method for controlling electrical power to loads of a premises comprising:
   receiving, at an energy management system for the premises, attributes for the loads via a user interface, wherein the loads are unmanaged by the energy management system while a local electrical grid is available to provide the electrical power, the electrical power to each load conducted via a respective switch connected to and controlled by a controller of the energy management system;
   storing, by the controller, the attributes as objects associated with scenes corresponding to the loads in a database of the energy management system, wherein a first attribute is an assigned ranking reflecting a relative importance of a load with respect to other loads; and
   in response to a failure of the local electrical grid to provide the electrical power, the controller configured to,
      retain power to one or more of the loads from an alternative source by controlling a power conducting state of the respective switch at the energy management system according to the stored first attribute by order of ranking such that a current total load of the premises does not exceed a power generation capacity of the alternative source, and
      activate the controlled power conducting state of respective switches to the loads in response to a service request input via the user interface according to one or more of the scenes unless (i) a respective load exceeds a runtime capacity and (ii) the respective load does not change state within a predetermined past period of time.

2. The method of claim 1 wherein the controller is further configured to:
   in response to determining that an energy storage capacity powering the loads is less than 20%, display a change to a configuration to critical absent receiving an override via the user interface.

3. The method of claim 2 wherein the controller is further configured to:
   in response to the absence of the override, deactivate the power conducting state of respective switches for unspecified loads.

4. The method of claim 3 wherein the unspecified loads are prevented from being turned on via the user interface.

5. The method of claim 1 wherein the controller is further configured to:
   in response to the local electrical grid being available to supply the electrical power,
      supply one or more of the loads of the premises from an auxiliary energy storage system during peak pricing of the local electrical grid.

6. The method of claim 1 wherein a second stored attribute by the controller of the one or more loads indicates whether the one or more of the loads managed according to a criticality ranking can operate intermittently.

7. The method of claim 6 wherein the controller is further configured to manage the one or more loads according to the criticality ranking by,
   controlling a supply of power intermittently to a first load of the one or more loads managed according to the criticality ranking based on a setpoint associated with the first load.

8. The method of claim 1 further comprising:
   associating an automation service with a first load to inform the controller of the energy management system whether the first load is in an operating condition to support the automation service.

9. The method of claim 8 wherein the automation service controls a power outlet supplying electricity to the first load.

10. The method of claim 1 wherein the respective switches providing electrical power to the one or more of the loads is controlled by an intelligent circuit breaker in communication with the controller of the energy management system.

11. A system comprising:
    an energy management system having a controller with a processor and a memory for managing electrical power to loads of a premises, the controller configured to,
    receive attributes for the loads at a user interface, wherein the loads are unmanaged by the energy management system while a local electrical grid is available to provide the electrical power, the electrical power to each load conducted via a respective switch connected to and controlled by the energy management system;
    store the attributes of the loads as objects associated with scenes corresponding to the loads in a database of the energy management system, wherein a first attribute is an assigned ranking reflecting a relative importance of a load with respect to other loads; and
    in response to a local electrical grid failure, the controller further configured to,
    retain power to one or more of the loads from an alternative source by controlling a power conducting state of the respective switch according to the stored first attribute by order of ranking such that a current total load of the premises does not exceed a power generating capacity of the alternative source; and activate the controlled power conducting state of respective switches to the loads in response to a service request input via the user interface according to one or more of the scenes unless (i) a respective load exceeds the power generating capacity and (ii) the respective load does not change state within a predetermined past period of time.

12. The system of claim 11 wherein the controller of the energy management system is further configured to communicate with a user control device to display a runtime capacity of the energy storage system according to the total current load of the premises.

13. The system of claim 12 wherein the controller of the energy management system is further configured to deactivate the power conducting state of respective switches to unspecified loads according to the stored first attribute by order of ranking.

14. The system of claim 13 wherein the controller of the energy management system is further configured to prevent unspecified loads from being turned on via the user interface.

15. The system of claim 11 wherein a second stored attribute by the controller of the one or more loads indicates whether the one or more of the loads managed according to a criticality ranking can operate intermittently.

16. The system of claim 11 wherein the controller of the energy management system configured to manage the electrical power to the one or more of the loads according to a criticality ranking is further configured to:
control a supply of power intermittently to a first load of the one or more loads managed according to the criticality ranking based on a setpoint associated with the first load.

17. The system of claim 11 wherein the controller of the energy management system is further configured to:
associate an automation service with a first load to inform the energy management system whether the first load is in an operating condition to support the automation service.

18. The system of claim 17 wherein the automation service controls a power outlet supplying electricity to the first load.

19. The system of claim 11 wherein each of the switches conducting power to the loads is activated by an intelligent circuit breaker in communication with the controller of the energy management system.

20. A non-transitory computer readable medium system configured for execution on a controller having a processor with program instructions configured to:
receive, at an energy management system including the controller for controlling electrical power to loads of a premises, attributes for the loads via a user interface, wherein the loads are unmanaged by the energy management system while a local electrical grid is available to provide the electrical power, the electrical power to each load conducted via a respective switch connected to and controlled by the energy management system;
store the attributes of the loads as objects associated with scenes corresponding to the loads in a database of the energy management system, wherein a first attribute is an assigned ranking reflecting a relative importance of a load with respect to other loads;
respond to a local electrical grid failure by,
retaining power to one or more of the loads from an alternative source by controlling a power conducting state of the respective switch according to the stored first attribute by order of ranking such that a current total load of the premises does not exceed a power generation capacity of the alternative source and
activating the controlled power conducting state of respective switch to the loads in response to a service request input via the user interface according to one or more of the scenes unless (i) a respective load exceeds the power generation capacity and (ii) the respective load does not change state within a predetermined past period of time.

* * * * *